United States Patent [19]
Toh et al.

[11] Patent Number: 5,395,470
[45] Date of Patent: Mar. 7, 1995

[54] METHOD FOR MOLDING A LIQUID CRYSTAL RESIN SHEET AND MOLDING APPARATUS THEREOF

[75] Inventors: Kazuhisa Toh, Kure; Masayasu Nishihara, Hiroshima; Kenji Moriwaki, Higashi hiroshima; Masatoshi Shinomori, Hatsukaichi, all of Japan

[73] Assignee: Mazda Motor Corporation, Hiroshima, Japan

[21] Appl. No.: 55,117

[22] Filed: Apr. 30, 1993

[30] Foreign Application Priority Data

| Apr. 30, 1992 | [JP] | Japan | 4-111358 |
| Sep. 28, 1992 | [JP] | Japan | 4-257740 |
| Sep. 28, 1992 | [JP] | Japan | 4-257742 |
| Sep. 28, 1992 | [JP] | Japan | 4-257743 |

[51] Int. Cl.⁶ ............................................. B29C 47/02
[52] U.S. Cl. ............................. 156/244.11; 156/244.12
[58] Field of Search ................. 156/244.11, 244.12, 156/243

[56] References Cited

U.S. PATENT DOCUMENTS

| 3,444,031 | 5/1969 | Schrenk | 156/244.12 |
| 4,592,938 | 6/1986 | Benoit | 156/244.12 |
| 4,728,698 | 3/1988 | Isayev et al. | |
| 4,923,551 | 5/1990 | Wagers et al. | 156/244.11 |

FOREIGN PATENT DOCUMENTS

| 0072210A | 2/1983 | European Pat. Off. | C08J 5/18 |
| 0133552A | 2/1985 | European Pat. Off. | C08J 5/18 |
| 0278066A | 8/1988 | European Pat. Off. | C08L 79/08 |
| 0310352A | 4/1989 | European Pat. Off. | B29J 43/20 |
| 63-264323 | 4/1987 | Japan . | |
| 62-116666 | 5/1987 | Japan . | |
| 64-90255 | 4/1989 | Japan . | |
| 1-259062 | 10/1989 | Japan . | |
| 1-320129 | 12/1989 | Japan . | |

OTHER PUBLICATIONS

Japanese Patents Gazette, May 27, 1987, "High-strength laminated sheets–comprise monoaxially stretched films ... resin" (J6 2055-130-A).

Patent Abstract of Japanese Patent No. JP2227232, Sep. 10, 1990, "Manufacturing of Liquid Crystal Polymer Film".

European Search Report No. EP 93 10 7012, Jul. 2, 1993.

*Primary Examiner*—Caleb Weston
*Attorney, Agent, or Firm*—Fish & Richardson

[57] ABSTRACT

The present invention is to provide a method and an apparatus for molding a resin composite sheet having an improved composite property. Therefore, the method and apparatus according to the present invention comprises a step or means of extruding film sheets through plurality of dies from a thermoplastic composite composition comprising a thermoplastic matrix resin, a liquid crystal resin which has a liquid crystal transition temperature higher than a minimum temperature of the matrix resin and an ability to be melt-extruded into a fiber in the matrix resin; a step or means of laminating the liquid crystal resin composite films into an integral or one body sheet by superposing and pressing them to each other at a melt-bonding temperature higher than the minimum moldable temperature of the matrix resin and lower than the liquid crystal transition temperature while discharging the air therebetween by means of the pressing pressure.

5 Claims, 17 Drawing Sheets

Fig. 8
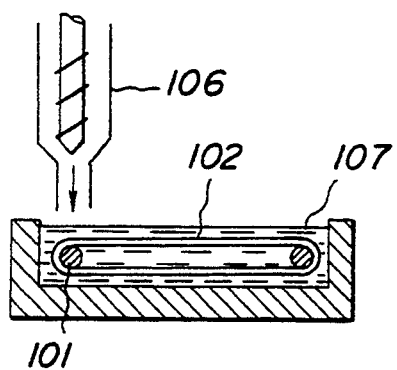
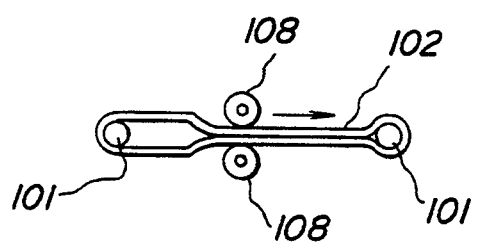
Fig. 9

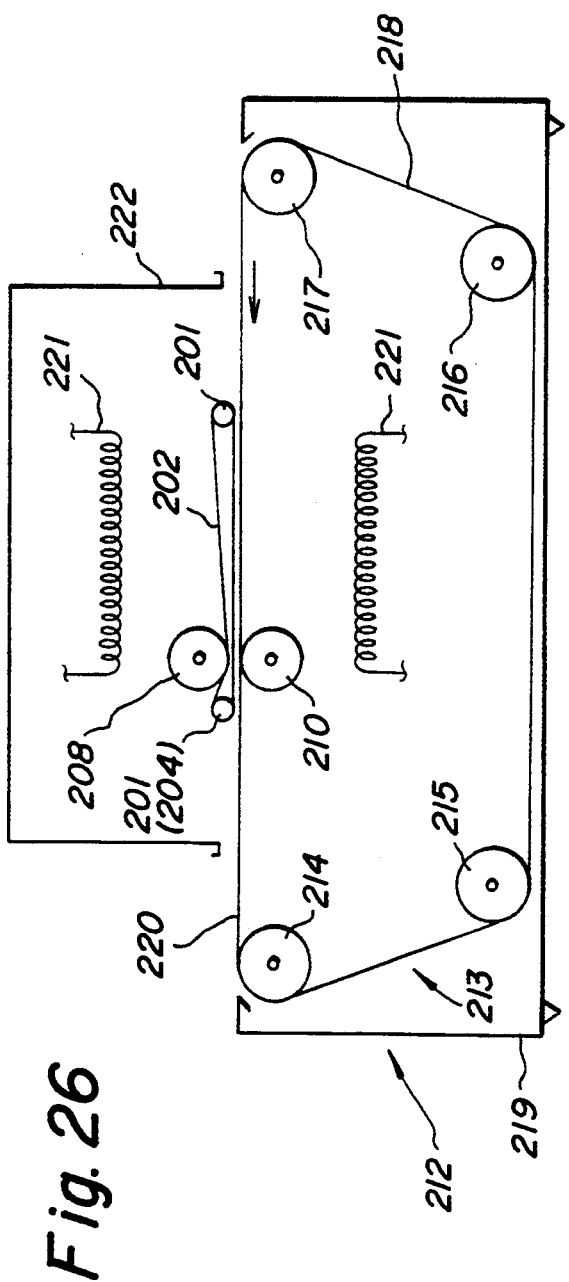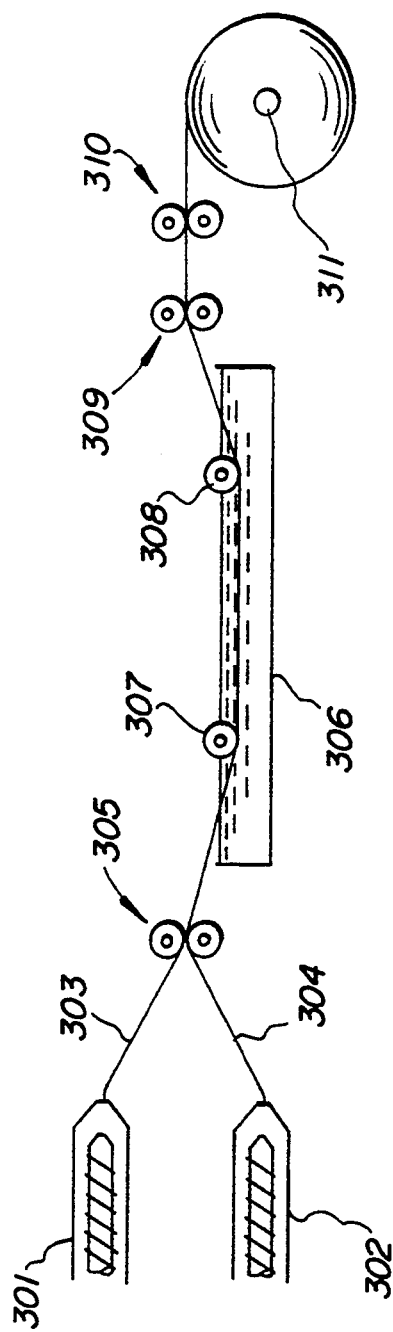

METHOD FOR MOLDING A LIQUID CRYSTAL RESIN SHEET AND MOLDING APPARATUS THEREOF

BACKGROUND OF THE INVENTION

1. Field of the Invention

The present invention relates to a method for molding a liquid crystal resin sheet and a molding apparatus thereof.

2. Description of the Prior Art

Recently, there have been proposed a liquid crystal resin composite for improving a tensile strength of a matrix resin by the liquid crystal resin fibers dispersed therein (see Japanese Patent Tokkaisho 64-90255). The liquid crystal resin composite is prepared by melt-extruding a mixture comprising a thermoplastic resin as a matrix resin mixed with a predetermined amount of the liquid crystal resin having a liquid crystal transition point than a minimum moldable temperature of the matrix resin. The composite material comes into public attention as a substitute of the conventional fiber reinforce plastic (FRP) composite because the advantage of the composite material is easy to be recycled. Further, there has been found that reinforcement property is changed according to a fiber formation degree of the liquid crystal resin and the more the fiber formation degree advances, the more the property improves. Therefore, it has been found by us that the melt-extruding process of the mixture should be carried in a manner that the liquid crystal resin fibers result in being formed in the matrix resin with a aspect ratio of 3 or more (see FIG. 1) and the resulting composite is preferably further subjected to a drawing treatment.

However, such improvement of the property by means of drawing is limited and the drawing treatment make the resulting composite material into thin films which are not suitable to a molding process, so that it is necessary to provide a method and an apparatus for molding a composite sheet suitable to be molded while having an improved composite effect.

SUMMARY OF THE INVENTION

The major object of the present invention is therefore to provide a method for molding a liquid crystal resin composite sheet on the basis of finding out the fact that the resin composite sheet having a thickness suitable to be molded while having an improved composite effect can be obtained by melt-extruding thin film sheets of the liquid crystal resin composite provided with a high fiber formation degree and laminating them at such a melt-bonding or welding condition that prevents the reinforcing fibers in the film sheets from being destroyed or extinguished.

Therefore, according to a first aspect of the present invention, there is provided a method for molding a liquid crystal resin composite sheet which comprises: a step of extruding liquid crystal resin composite film sheets through a plurality of dies from a thermoplastic composite composition comprising a thermoplastic matrix resin and a thermoplastic liquid crystal resin which has a liquid crystal transition temperature higher than a minimum moldable temperature of said matrix resin in a mixture proportion wherein the liquid crystal resin is capable of being melt-extruded into a fiber in the matrix resin at a shearing rate whereat the liquid crystal resin is capable of being melt-extruded into the fibers having an aspect ratio of 3 or more; a step of laminating the liquid crystal resin composite film sheets into one body or integral sheet by superposing and pressing them to each other at a melt-bonding or welding temperature higher than the minimum moldable temperature of the matrix resin and lower than the liquid crystal transition temperature while discharging the air therebetween by means of the pressing pressure.

The matrix resin may be selected from the group comprising thermoplastic resins such as polypropylene, polyethylene, polystyrene, ABS(acrylonitrile-butadiene-styrene), polyamide(nylon), polycarbonate, polybutyrene telephtalate, polyethylene telephtalate, modified PPE (polyphenylene ether), polyphenylene sulfide, polyether sulfide, and their modification or their blends (polymer alloy).

On the other hand, the liquid crystal resin (hereinafter referred as to LCR) is not limited and may be selected from the thermoplastic resins having a liquid crystal transition temperature higher, preferably by 20° C. or more, than the minimum moldable temperature of the matrix resin. Examples may include a thermoplastic liquid crystal polyester and a thermoplastic liquid crystal polyesteramide. Among them, the liquid crystal resins of Trade name VECTRA(made by POLYPLASTICS Co.,Ltd.), ECONOL, ZAIDA and others are commercially available.

The fiber formable range of LCR is dependent upon the kind and nature of the matrix resin. The compounding ratio of the LCR to the matrix resin should be adjusted to the fiber formable range lower than the phase conversion range as shown in FIG. 2. For example, in the case of using a polyamide resin as the matrix resin, preferably from 40 to 80 weight % based on the weight of the composite; in the case of ABS(Acrylonitrile-butandiene-styrene copolymer) resin, preferably from 30 to 75 weight %; in the case of PC(polycarbonate)-/ABS resin, preferably from 3 to 70 weight %; in the case of PC/PBT(polybutyrene telephtalate) resin, preferably from 2 to 60 weight %, in the case of PPO (polyphenyleneoxide)/PA6 (nylon), preferably from 3 to 65 weight %; in the case of the modified PPO resin, preferably from 3 to 60 weight %, in the case of polypropylene, preferably from 2 to 70 weight %; in the case of polycarbonate, preferably from 3 to 70 weight %; and in the case of PBT resin, preferably from 10 to 70 weight %.

According to the present invention, the composite composition can be melt-extruded through a plurality of the dies into the composite film sheets, so that an increasing shear rate make the LCR in the matrix resin into fibers thereof having the aspect ratio of 3 or more which are effective to reinforce the matrix resin. Then, as the composite film sheets are 0.1 to 0.3 mm thick and too thin to be molded, they are laminated at a melt-bonding or welding temperature higher than the minimum moldable temperature and lower than the liquid crystal transition temperature of the LCR, so that the LCR fibers in the films have not been destroyed and are formed into one body or an integral sheet having a thickness suitable for molding.

The resin composite composition should be melt-extruded at a shear rate from $3 \times 10^2$ to $10^5$ sec$^{-1}$ to form the LCR in the matrix resin into the fibers having an aspect ratio of 3 or more.

Further, the resulting film sheets may be subjected to a drawing treatment after cooling or continuously without cooling after extruding. In this case, the drawing ratio (cross sectional area before drawing/ that after drawing) is preferably from 11 to 120.

Thereafter, the film sheets are laminated and welded into one integral sheet continuously after the extruding step. In the laminating step, it is preferable in order to maintain surely the fiber formation condition of the LCR, that the film sheets extruded through the dies are once cooled down to the temperature lower than the minimum moldable temperature of the matrix resin and then are heated up to the melt-bonding temperature, for example by means of the pressure rollers at least one of which is heated.

In the case of pressing the superposed film sheets by a pair of pressure rollers, large compression ratio is possible to makes the superposed film sheets to be drawn at the same time of melt-bonding thereof.

Further, the LCR fibers in the matrix is usually oriented in the extruding direction. Therefore, the extruded film sheets are superposed in the same direction to give a composite sheet having one directional property relating to the composite effect of the LCR. On the other hand, the extruded film sheets are superposed in the different direction to give a pseudo-isotropic composite sheet.

According to a further aspect of the present invention, there are provided a variety of apparatuses for carrying out the above molding method from the different view points, which comprises a means for extruding a composite composition comprising a thermoplastic matrix resin and a thermoplastic liquid crystal resin into a composite resin film in a manner that the liquid crystal resin fibers are made and dispersed in the matrix resin; a means for laminating the extruded composite resin films; and a means for pressing the laminated resin films in such a way to weld to each other.

Firstly, in the case of using a pair of the pressure rollers in order to press the superposed film sheets, there is provided an apparatus for molding a liquid crystal resin composite sheet which comprises: an extruder for melt-extruding a thermoplastic composite composition into a liquid crystal resin composite film through single die or plurality of dies which extruding directions are same at a temperature above the liquid crystal transition temperature and at a shearing rate whereat the liquid crystal resin is capable of being melt-extruded into the fibers having an aspect ratio of 3 or more; a pair of pressure rollers positioned at the downstream of the die or dies for laminating the liquid crystal resin composite films into an integral or one body sheet, which distance between the rollers is adjusted to weld the films by passing them therebetween at a melt-bonding temperature higher than the minimum moldable temperature of the matrix resin and lower than the liquid crystal transition temperature; and a cutting means for cutting the laminated and welded composite integral sheet into a predetermined length.

In the first embodiment, there is preferably provided at a downstream of the die with a cooling means which make the extruded film sheets to be cooled down to the temperature lower than the minimun moldable temperature of the matrix resin and also at an upstream of the pressure rollers with a heating means which make the film sheets to be heated up to the temperature higher than the minimum moldable temperature and lower than the liquid crystal transition temperature in order to set the film sheets to a determined welding temperature range with ease.

Further, there is preferably provided a means to adjust the distance between the pressure rollers, which can make the film sheets to be drawn at the same time of melt-bonding thereof.

Furthermore, in order to prepare the isotropic one boby sheet by laminating the film sheets having one directional property at the different direction, there are preferably arranged the extruders in a manner that the feeding directions of the film sheets to be extruded from the extruders are crossed within 90° and also arranged a heat pressing means to weld the film sheets at a downstream of the crossing point.

Secondly, in the case of using a mandrel in order to the superposed film sheet in a winded form, there is provided an apparatus for molding a liquid crystal resin composite, comprising: a means for extruding a composite composition comprising a thermoplastic matrix resin and a liquid crystal resin into a composite resin sheet in a manner that the liquid crystal resin fibers are made and dispersed in the matrix resin; an apparatus for laminating the extruded composite resin sheet; and a means for pressing the laminated resin sheets in such a way to weld to each other, wherein said laminating apparatus comprises an outer periphery mandrel on which the composite film sheet is wound to form a laminated resin sheet.

Further, in the second embodiment, a preferable pressing means is to compress internally the wound film sheets with an expansion force of the mandrel in a winding direction or a direction perpendicular to the winding direction thereof. Another pressing means is to compress externally the wound film sheets so as to weld or adhere to each other.

Further means to compress the wound film sheets is to accommodate the wound film sheets in a vacuum bag. When the vacuum bag is evacuated, the wound sheets are compressed with the atmospheric pressure. It is preferable that the vacuum bag is made of a material having a melting point higher than the melting point of the matrix resin.

The LCR has a transition temperature higher than the minimum moldable temperature of the matrix resin. A preferable method is to use a heating means for heat the integral sheets up to a temperature between the minimum moldable temperature and the transition temperature of the LCR.

Thirdly, in the case of using a pair of mandrels, there is provided an apparatus for molding a composite material having reinforcing liquid crystal dispersed in thermoplastic matrix resin, comprising:

an extruder for extruding said composite material into a resin sheet having the liquid crystal of a fiber form dispersed therein; a pair of mandrels for winding the extruded resin sheet to form a integral resin sheet; and a separating means for separating the integral resin sheets from said mandrel.

It is preferable that the separating means comprises pressing means for pressing the wound film sheets so as to weld to each other.

The LCR has a transition temperature higher than the minimum moldable temperature of the matrix resin. When the wound film sheets are pressed by the pressing means and are separated by the separating means, the integral sheets are kept at a given temperature between the minimum moldable temperature of the matrix resin and the transition temperature of the LCR. It is possible to perform the separating means with the pressing means. It is preferable to provide heating means for heating the integral sheets at the given temperature.

It is possible to attach the separating means to the mandrel. The mandrel is equipped with a sharp edge to extend in a direction perpendicular to the winding direction of the integral resin sheets. The integral resin sheet is cut with the sharp edge to be separated from the mandrel when the pressing means and the heating means are actuated.

In accordance with the present invention, the film sheets wound on the mandrel are heated to a temperature at which the matrix resin becomes soft, that is, the matrix resin is able to be molded and compressed with a compression means so as to expel the foreign materials such as air. This process permits the laminated film sheets to adhere to each other into one thick plate of the composite resin reinforced by the LCR fibers. After this, the thick plate is separated from the mandrel by using the separating means.

Further, it is possible to form the separating means at the pressure roller acting as the pressing means. In this case, the heating means is attached to the mandrel and the pressure roller. Then, the mandrel and the pressure poller are heated in advance to a temperature higher than the melting point of the matrix resin with the heating means. Accordingly, the integral sheet is easily made soft upon engagement with the mandrel and the pressure roller. In some modification method, the integral sheet can be separated from the mandrel with a force modified by changing the pressing force resulting from the pressure roller.

In the case that the separating means is attached to the mandrel, when the integral sheet on the mandrel is made soft and subjected to an expanding force higher than given size, the integral sheet is cut by a sharp edge equipped at the mandrel and is separated from the mandrel.

However, it has been difficult to wind uniformly the extruded resin sheet of a thin plate. There has been a problem: On the way of the winding, the sheet is broken. Accordingly, the winding must be stopped. The wound style is not suitable for the next working step to make the thick plate. Fourthly, therefore, in order to provide an apparatus for making the extruded resin sheet to being wound correctly and being suitably subjected to the next working step, there is an apparatus for molding a liquid crystal resin composite sheet, comprising:

a first extruder for extruding a composite composition comprising a thermoplastic matrix resin and a liquid crystal resin in a first mixture proportion into a first composite resin film; a second extruder for extruding a composite composition comprising a thermoplastic matrix resin and a liquid crystal resin in a second mixture proportion into a second composite resin sheet; a means for adhering the first composite resin films and the second composite resin films to each other at a temperature higher than the minimum moldable temperature of the matrix resin and lower than the transition temperature of the liquid crystal resin; and a means for providing a tensile force to the welded composite resin sheets.

It is preferable that the extension force providing means comprises extending means for extending the welded resin sheet under providing the extended sheet with an extension force.

It is further preferable that an apparatus for molding a composite material having reinforcing liquid crystal dispersed in thermoplastic matrix resin comprises winding means for winding the extruded resin film sheet provided with the extension force by the extension force providing means.

In accordance with the fourth embodiment of the present invention, there is a difference between the first mixing ratio of liquid crystal to the thermoplastic resin extruded by the first extruder and the second mixing ratio of liquid crystal to the thermoplastic resin extruded by the second extruder. In general, the composite material having a higher content of the liquid crystal fibers results in a higher mechanical strength and the composite material having a lower content of the liquid crystal fibers results in a lower mechanical strength but improves the adhesion because of higher content of the matrix resin. An apparatus for molding a composite material having reinforcing liquid crystal dispersed in thermoplastic matrix resin according to the present invention is to adhere two extruded resin sheets having different mixing ratios of liquid crystal to the thermoplastic resin from each other. When compared with a simple structure having two extruded resin sheets of the same mixing ratios of liquid crystal to the thermoplastic resin, the structure according to the present invention makes it possible to improve the adhesion property due to the matrix resin of the first mixing ratio at a temperature higher than the given temperature and to improve the mechanical strength due to the second mixing ratio at the given temperature. As a result, the structure according to the present invention satisfies both of the mechanical strength and the adhesion strength.

Accordingly, it is possible to obtain the extruded film sheet improved in the flexible property and the mechanical strength and hence to wind correctly the extruded resin sheet around the mandrel.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 8 is an outline view of an alternative apparatus according to the second embodiment;

FIG. 9 is a working explanation view of FIG. 8;

FIG. 26 is an sectional view of a heat welding apparatus used in the third embodiment;

FIG. 27 is an outline view of the molding steps of the fourth embodiment according to the present invention.

DETAILED DESCRIPTION OF THE PREFERRED EMBODIMENTS

Embodiment 1

Figure 1:
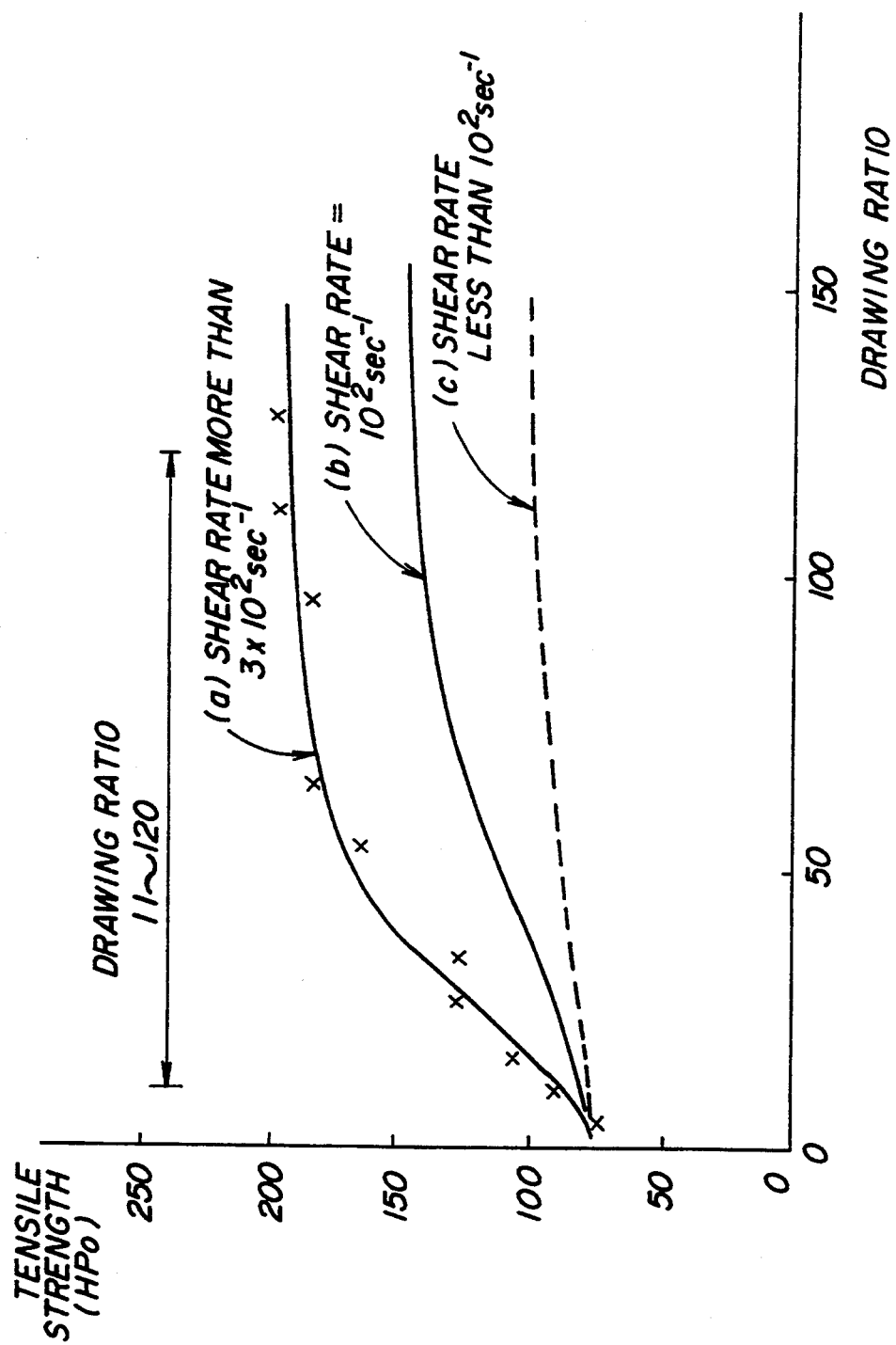
FIG. 1 is a graph showing an interaction between the apparent shear rate and the drawing ratio in the respect of the tensile strength.

FIG. 1 shows an outline of the preferred first molding apparatus for carrying out the method according to the present invention. In FIG. 1, an extruder 1 comprises an inlet 11 for charging thereinto thermoplastic matrix resin chips and thermoplastic LCR chips, which interior 13 is designed to melt the matrix resin and make the LCR to be mixed and dispersed therein. At the outlet thereof, there are mounted a plurality of extruding nozzle dies which are projected forward and parallel to each other with a same interval in a perpendicular direction and are designed in a manner to capable of extruding the composite resin into film sheets at a shear rate of $3 \times 10^2$ to $10^5 \sec^{-1}$. Therefore, the resulting film sheets usually have a thickness of 0.1 to 0.2 mm and comprise the LCR fibers having an aspect ratio of 3 or more which are oriented in the extruding direction.

2 denotes a laminating apparatus for welding the film sheets to each other at a controlled temperature after being drawn, which comprises a plurality of small rollers 21 which surface temperature is adjustable and which are arranged in a case 20 which encloses a part of running paths of the film sheets F. The small rollers are arranged to cross the film sheets F and to be parallel to each other with certain interval in the sheet running direction, and also superposed in the perpendicular direction to form a temperature controlling zone, which is followed by a pair of up and down pressure rollers 22, 22 opposed to each other at a determined interval. Therefore, the extruded film sheets F pass between the small rollers positioned in the temperature controlling zone to be heated and kept to a determined welding temperature which is higher than the minimum moldable temperature and lower than the liquid crystal transition temperature. Then, the film sheets gather to be superposed to each other and come to be inserted between a pair of the up and down pressure rollers 22, 22. Accordingly, the film sheets F just extruded are drawn and at the same time they are welded to each other by melting the matrix resin existing at the interface thereof while discharging air therebetween. In some cases, there may be provided at the drawing zone a cooling means for blowing cooling air between the film sheets in a direction cross to the extruding direction. Further, while the film sheets are kept to the determined welding temperature by means of the small rollers for controlling the temperature, it is preferable that the pressure rollers are also kept to the determined welding temperature which is higher than the minimum moldable temperature and lower than the liquid crystal transition temperature. In such a case, it is better that the temperature of the pressure rollers is somewhat higher than that of the temperature controlling rollers.

3 denotes a roller apparatus for preventing the film sheets from loosening, which comprises rollers 31 arranged in a zig-zag manner to take off the looseness by making the welded one body sheets S passed therethrough. Thereafter, the one body sheets S are cut into a determined length by a cutting apparatus 4. The cutting apparatus 4 comprises a pair of pressing plates 41, 41 which have area capable of covering all the width and the certain length of the one body sheets S and further a cutter 42 positioned near the pressing plates 41, is designed to cut the sheets S into a determined length by the cutter 42 while the sheets S are being pressed by the pressing plates 41.

Figure 2:
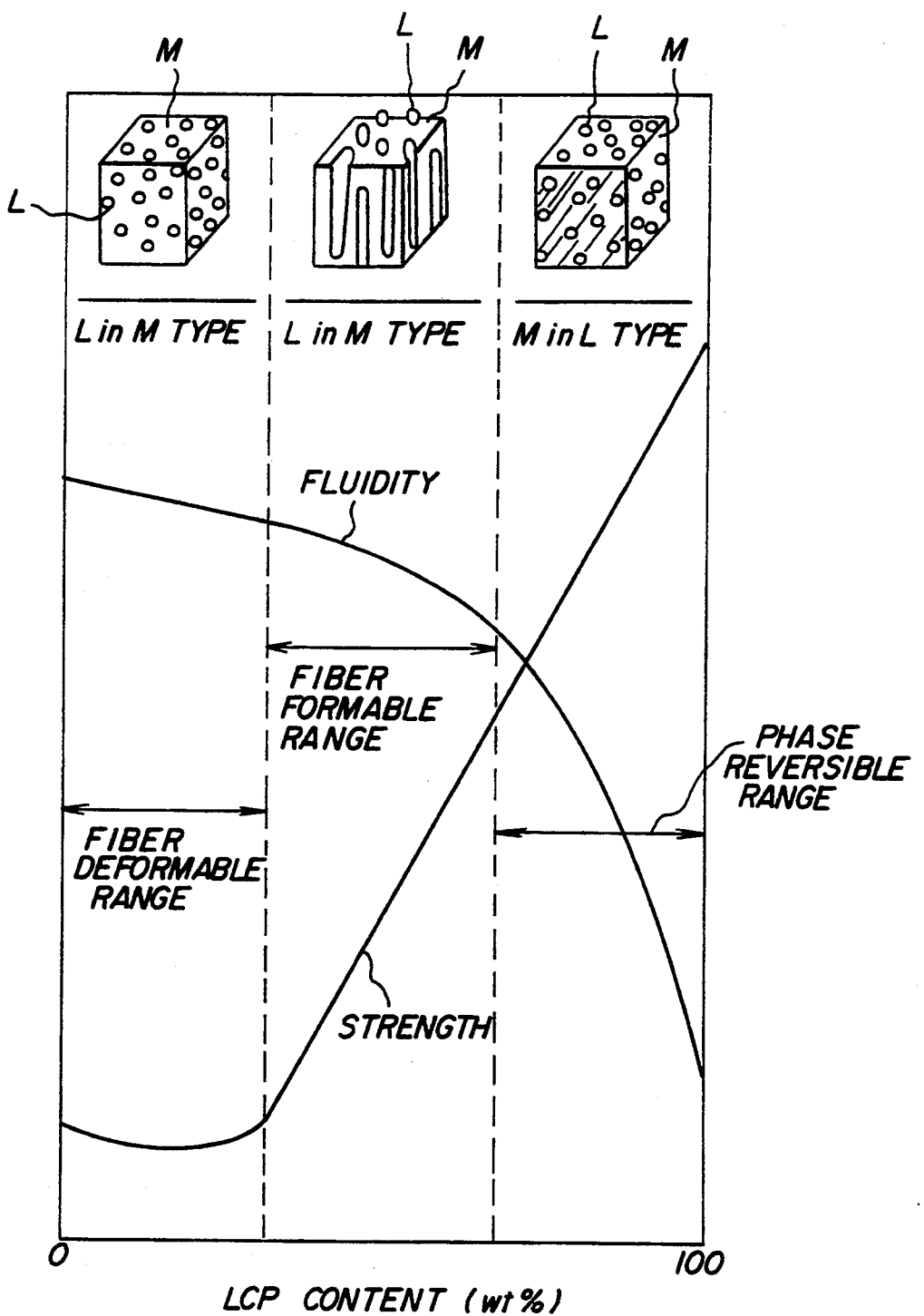
FIG. 2 is a graph showing an effect of the content of the LCR on the state variation of the composite material.
Figure 3:
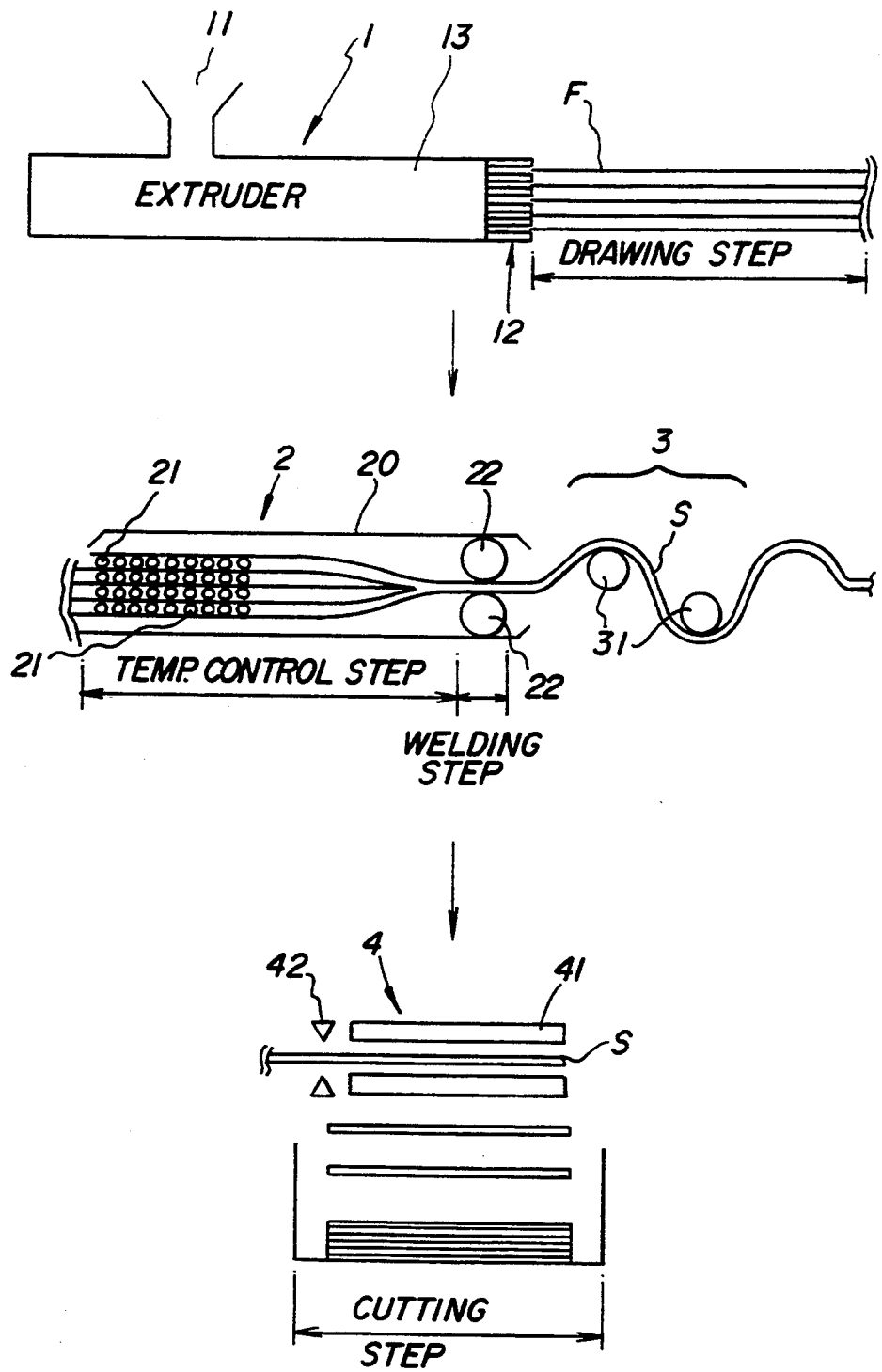
FIG. 3 is an outline view of the molding apparatus according to the first embodiment of the present invention.
Figure 4:
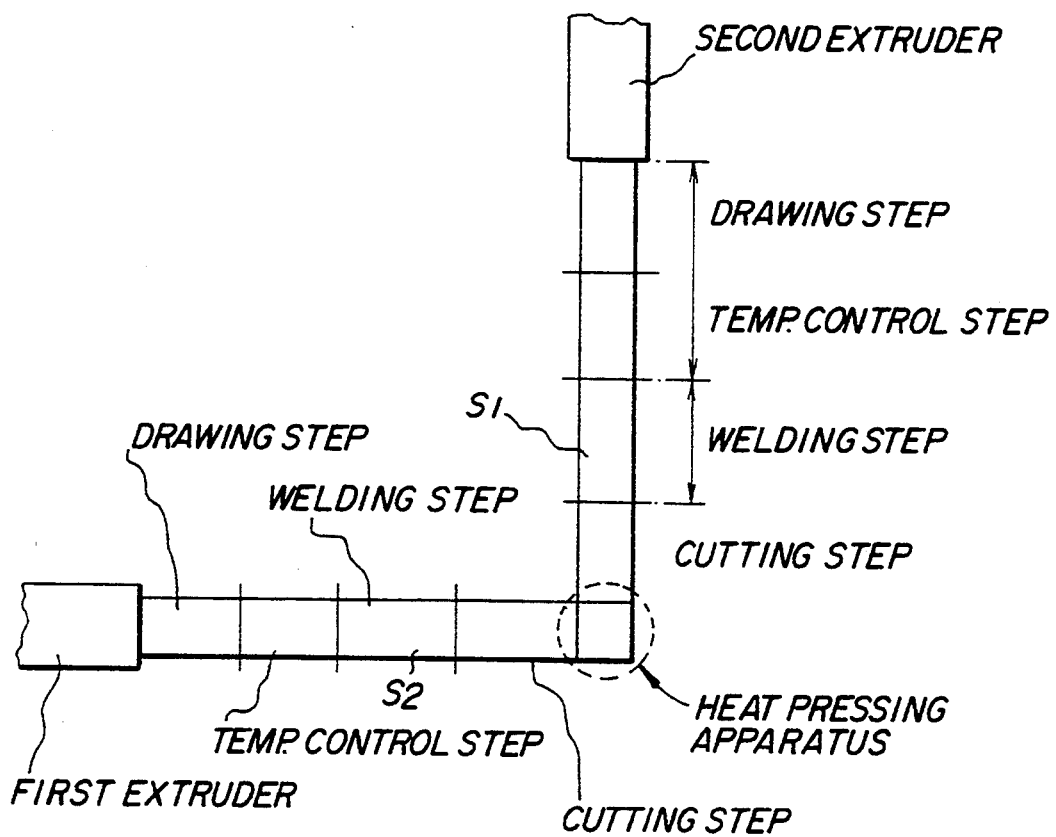
FIG. 4 is an arrangement outline view of the alternative molding apparatus according to the first embodiment of the present invention.
Figure 5:
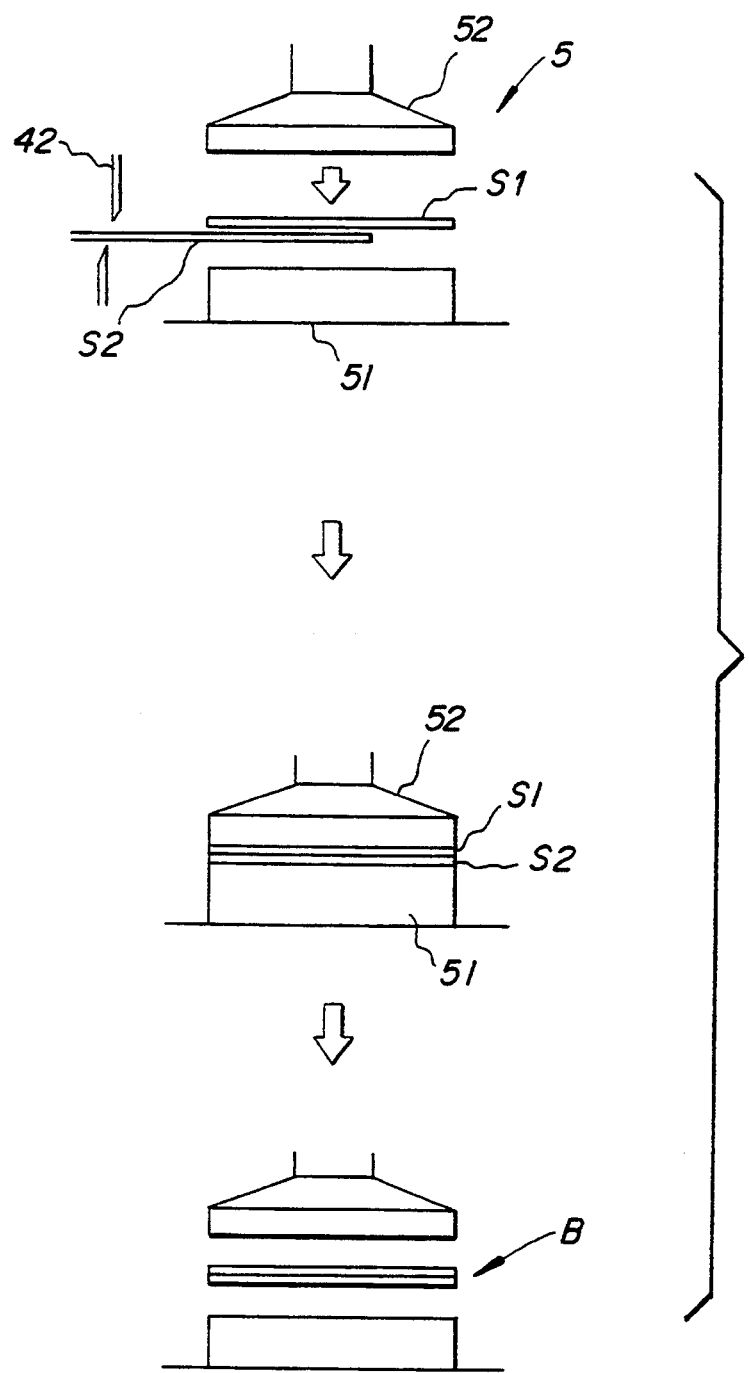
FIG. 5 is a working explanation view of the heat pressing apparatus in FIG. 4.

FIG. 2 shows a cross-laminating state wherein the two extruding directions of the molding apparatuses are arranged so as to cross the fiber oriented directions in the superposed sheets S. At the crossing point, there is arranged a heat pressing apparatus 5 shown in FIG. 3 instead of a pair of the pressing plates. The heat pressing apparatus 5 comprises a supporting plate 51 positioned near the cutter 42 and an elevating heat pressing plate 52 which is controlled to the temperature lower than the minimum moldable temperature of the matrix resin and positioned above the supporting plate 51, and thus is designed to press-weld the cross-superposed sheets S1 and S2 into a blank material B having the LCR fibers crossed in a right angle. The crossing angle between the composite sheets S1 and S2 is adjusted within 90°, so that for example four composite sheets are superposed at the crossing angle interval of 45° and welded to each other to obtain a pseudoisotropic material which is used as an isotropic material suitable to a material of floor panel or outer panel. On the other hand, the material having one directional property is useful to materials of bumper-reinforcement or leaf spring.

Example 1

40 weight parts of PA6 (UBE NYLON1030B made by UBE INDUSTRIES,LTD) as the matrix resin, 60 weight parts of aromatic polyester (VECTRA made by POLYPLASTICS Co. Ltd.) as the LCR are mixed and then extruded with drawing by means of a twin screw extruder (made by PLASTIC TECHNOLOGY Co., Ltd.) at the following conditions; screw diameter 30 mm, resin temperature 290° C., screw rotation number 75 rpm., die diameter 2 mm, shear rate 1700 $\sec^{-1}$. The resulting compsoite film of 0.1 to 0.2 mm thick are suporposed and laminated into one body sheet of 5 to 10 mm thick by passing them between a pair of heat pressing rollers (surface temp. 260° C.; roll interval 5 to 10 mm).

The molded products are subjected to a measuring of the tensile strength and it is confirmed that the products are sufficient in properties necessary for the composite material.

Example 2

The film sheets prepared in Example 1 and another film sheets having a thickness of 0.01 to 0.1 mm and made of PA resin (UBE NYLON1030B made by UBE INDUSTRIES,LTD) or maleic acid modified PP resin (ADMER made by MITSUI PETROCHEMICAL INDUSTRIES CO.,LTD.) are laminated alternatively to give a one body sheet having a thickness of 5 to 10 mm by the same method as Example 1.

The molded products are subjected to a measuring of the tensile strength and it is confirmed that the products are sufficient in properties necessary for the composite material and PA6 resin has a low melting viscosity on welding.

Example 3

30 weight parts of PA6 (UBE NYLON1030B made by UBE INDUSTRIES, LTD) as the matrix resin and 70 weight parts of aromatic polyester (VECTRA made by POLYPLASTICS Co. Ltd.) as the LCR are mixed and then extruded with drawing by means of a twin screw extruder (made by PLASTIC TECHNOLOGY Co., Ltd.) at the following conditions; screw diameter 30 mm, resin temperature 290° C., screw rotation number 75 rpm., die diameter 2 mm, shear rate 1700 sec$^{-1}$. The resulting composite film of 0.1 to 0.2 mm thick are superposed and laminated into a one directional property integral composite sheet of 5 to 10 mm thick by passing them between a pair of heat pressing rollers (surface temp. 260° C.; roll interval 5 to 10 mm).

On the other hand, 20 weight parts of PA6 (UBE NYLON1030B made by UBE INDUSTRIES, LTD) as the matrix resin and 80 weight parts of aromatic polyester (VECTRA made by POLYPLASTICS Co. Ltd.) as the LCR are mixed and then extruded with drawing by means of a twin screw extruder (made by PLASTIC TECHNOLOGY Co., Ltd.) at the above conditions. The resulting film sheets are cut into about 25 cm length and laminated into a random integral composite sheet.

Between a pair of the one directional property integral sheet, the random integral sheet is inserted and welded to each other by means of heat pressing at a suitable temperature higher than the minimum moldable temperature of the matrix resin and lower than the liquid crystal transition temperature to give a composite panel.

Example 4

30 weight parts of PA6 (UBE NYLON1030B made by UBE INDUSTRIES, LTD) as the matrix resin and 70 weight parts of aromatic polyester (VECTRA made by POLYPLASTICS Co. Ltd.) as the LCR are mixed and then extruded with drawing by means of a twin screw extruder (made by PLASTIC TECHNOLOGY Co., Ltd.) at the following conditions; screw diameter 30 mm, resin temperature 290° C., screw rotation number 75 rpm., die diameter 2 mm, shear rate 1700 sec$^{-1}$. The resulting composite film of 0.1 to 0.2 mm thick are superposed at the crossing angle interval of 45°, that is, −45°, 0°, 45°, 90° and laminated into an isotropic integral composite sheet of 5 to 10 mm thick by passing them between a pair of heat pressing rollers (surface temp. 260° C.; roll interval 5 to 10 mm).

On the other hand, 20 weight parts of PA6 (UBE NYLON1030B made by UBE INDUSTRIES, LTD) as the matrix resin and 80 weight parts of aromatic polyester (VECTRA made by POLYPLASTICS Co. Ltd.) as the LCR are mixed and then extruded with drawing by means of a twin screw extruder (made by PLASTIC TECHNOLOGY Co., Ltd.) at the above conditions. The resulting film sheets are cut into about 25 cm length and laminated into a random integral composite sheet.

Between a pair of the isotropic integral sheet, the random integral sheet is inserted and welded to each other by means of heat pressing at a suitable temperature higher than the minimum moldable temperature of the matrix resin and lower than the liquid crystal transition temperature to give a composite panel.

Embodiment 2

Example 5

The used matrix resin is PA6 (1013B, melting point=2150° C., made by UBE INDUSTRIES, LTD). The used liquid crystal resin is aromatic polyester (VECTRA A950 made by POLYPLASTIC CO., LTD.; melting point; 290° C.). The composite material is prepared from a mixture of 60 weight % of polystyrene and 40 weight % of aromatic polyester and then extruded into a film form with a two shaft extruder (type ST-30-S2-36L made by RESERCH LABORATORY OF PLASTIC TECHNOLOGY CO., LTD) at the following extrusion condition: screw diameter, 30 mm; resin temperature, 290° C.; screw rotation number, 100 rpm; and shear rate, 1700 sec$^{-1}$.

Figure 6:
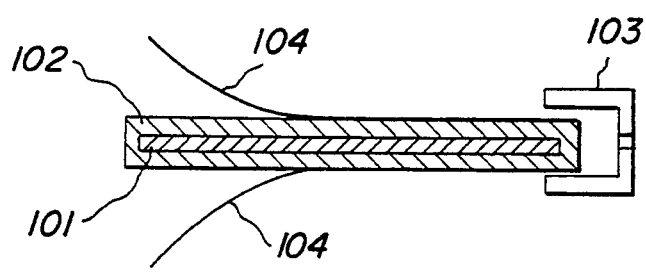
FIG. 6 is an outline sectional view of the molding apparatus according to the second embodiment of the present invention.

The extruded resin of a sheet form is wound around a mandrel 101 of a plate form, that is, a winding shaft so as to form an integral resin sheet. The mandrel 101 having the resin sheets 102 integrated thereon in a U letter form is mounted on a clamp jig 103 which has a pressure plate 104 attached to the heading thereof. The pressure plate 104 is made of a form memorizing alloy and is extended along with the surface of the integral sheets in a way to cover the integral sheets. The pressure plate 104 is opened at another heading at room temperature as shown in FIG. 6 and does not contact with the integral sheets 102.

Figure 7:
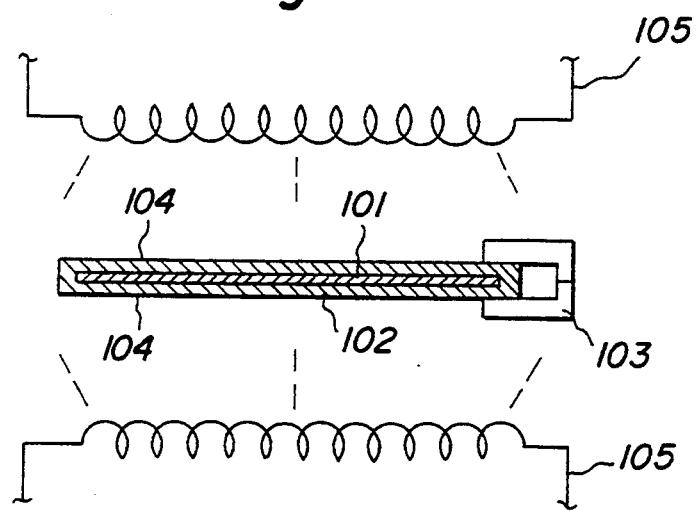
FIG. 7 is a working explanation view of FIG. 6.

The pressure plate 104 is in touch with the surface of the integral sheets when the clamp jig 103 is closed as shown in FIG. 7. Then, a heating means 105 heats the integral sheets 101 on the mandrel 102 together with the clamp jig 103 and the pressure plate 104. The pressure plate 104 made of a form memorizing ally is arranged to be closed at another heading upon being heated. at the final heating step, the pressure plate 104 compresses the integral sheets as shown in FIG. 7. The heating condition is different from the plate thickness of the final product.

This embodiment is subjected to the following heating conditions:

| plate thickness | inside temperature (upper limit) | outside temperature (upper limit) |
| --- | --- | --- |
| 3 mm–5 mm | 260° C. | 270° C. |
| 5 mm–7 mm | 250° C. | 270° C. |
| 7 mm–9 mm | 240° C. | 270° C. |

In such a way, the heating condition is adjusted to achieve the inside temperature and the outside temperature in accordance with the plate thickness. The later pressing operation can be carried out in a similar condition to that listed above.

When the outside temperature is higher than 270° C., the liquid crystal starts to be soft and to change in the properties. Accordingly, it is necessary not to make the outside temperature higher than 270° C.

The pressure plate 104 of a form memorizing alloy proceeds the compression force from the heading to another heading under being heated. As a result, the pressure plate 104 compresses the integral sheets 102 against the mandrel 101 and expels air from one heading to another heading to adhere the laminated sheets more strongly. During heating process, the matrix resin is heated up to a temperature higher than the lowest molding temperature of the matrix resin but is not heated up to a temperature higher than the transition temperature. Therefore, the LCR does not change in the fiber structure. There is no bad effect on the reinforcing function.

In such a way, it is possible to obtain a mold product of a thick plate form made of matrix resin having LCR fiber dispersed therein.

Example 6

The used matrix resin is PP (H501, melting point=176° C., made by SUMITOMO KAGAKU LTD.). The used liquid crystal resin is aromatic polyester (VECTRA A950 mace by POLYPLASTIC CO., LTD ;melting point ; 290° C.). The composite material is prepared from a mixture of 40 weight % of PP and 60 weight % of aromatic polyester and then extruded into a film form with a two shaft extruder (type ST-30-S2-36L made by RESEARCH LABORATORY OF PLASTICS TECHNOLOGY) at the following extrusion condition: screw diameter, 30 mm; resin temperature, 290° C.; screw rotation number, 100 rpm; and shear rate, 1700 sec$^{-1}$.

As shown in FIG. 8, the above mixture is extruded into a film sheet form with the extruder 106. The film sheet is wound on the two shaft mandrel 101 and is dipped into the molten matrix resin. During this process, the film sheet is heated at a temperature higher than minimum moldable temperature and lower than the transition temperature of the LCR. In this case, the heating condition differs with the thickness of the thickness of mold product. The heating condition of this embodiment is as follows:

This embodiment follows the conditions described below.

| plate thickness | inside temperature (upper limit) | outside temperature (upper limit) |
| --- | --- | --- |
| 3 mm-5 mm | 210° C. | 220° C. |
| 5 mm-7 mm | 200° C. | 220° C. |
| 7 mm-9 mm | 190° C. | 220° C. |

It is necessary to make the outside temperature lower than 220° C. because the matrix resin decomposes upon being heated at a temperature higher than 220° C. At this temperature, the resin of the film sheet is moved through the pressing rolls 108 under being adhered to the mandrel 101. The resin of a molten state has the excessive matrix resin 107 remained between the sheets. During the compression through the rollers 108, the remained matrix resin 107 is expelled from the wound film sheets to promote the adhesion between the sheets.

Example 7

The starting material and composition used in this embodiment are the same as those of Example 5 and are extruded into a film sheet 102 with the extruder the same as that of the Example 5.

Figure 10:
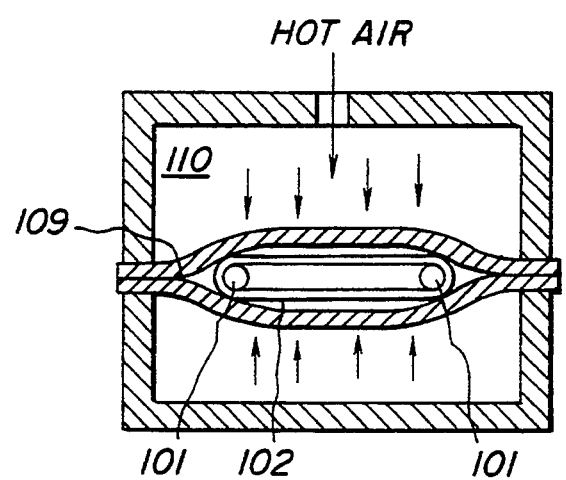
FIG. 10 is an outline view of a first alternative apparatus according to the second embodiment.

As shown in FIG. 10, the extruded film sheet wound on a mandrel 101 is accommodated in a vacuum bag and then put in a heating chamber 110. The vacuum chamber is evacuated under being heated with warm wind introduced into the heating chamber 110. The laminated sheets in the vacuum bag is pressed with the atmospheric pressure so as to adhere the sheets to each other into an integral sheet.

Example 8

The film sheet is formed in a similar way to that of the Example 5.

Figure 11:
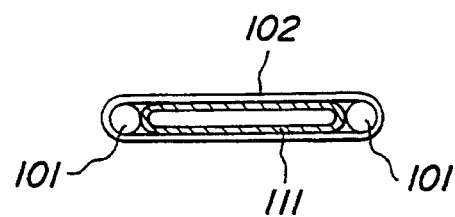
FIG. 11 is an outline view of a second alternative apparatus according to the second embodiment.
Figure 12:
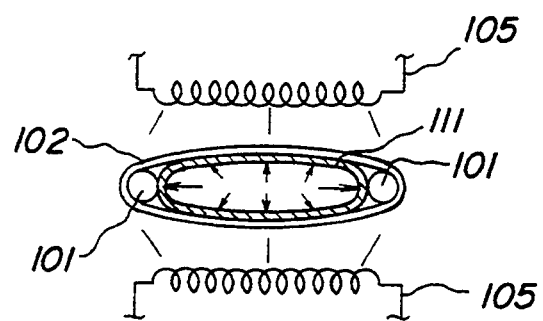
FIG. 12 is a working explanation view of FIG. 11.

The mandrel 101 of this embodiment comprises an air bag 111 positioned between two winding shafts as shown in FIG. 11. when the film sheet is wound, the air bag 111 shrinks. When the air bag 111 is heated by the heating means 105 as shown in FIG. 12, the air bag is fulfilled with gas and is expanded. The wound film sheet 102 is pressed from inside by the expanding force of the air bag and is adhered to each other into an integral sheet.

Example 9

The film sheet is prepared in a way similar to that of Example 5.

Figure 13:
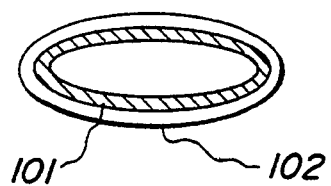
FIG. 13 is an outline view of a third alternative apparatus according to the second embodiment.
Figure 14:
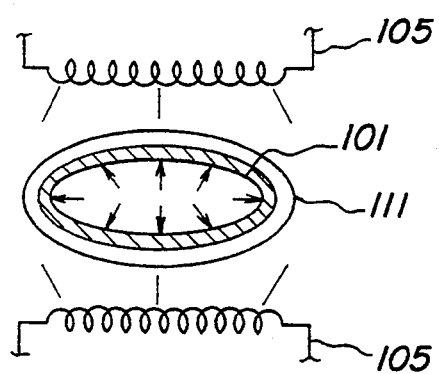
FIG. 14 is a working explanation view of FIG. 13.

The mandrel of this embodiment is flexible and has an ellipse cross section as shown in FIG. 13. The film sheet is wound on the mandrel 101. After that, the gas is introduced into the mandrel 101 to expand the mandrel 101 as shown in FIG. 14. at the same time, the laminated sheets 102 are heated externally by the heating means 105. then, the matrix resin in the laminated sheets 102 is heated to a molding temperature to adhere the sheets to each other into an integral sheet in a similar way to that of Example 8.

Example 10

The film sheet is prepared in a way similar to that of Example 5.

Figure 15:
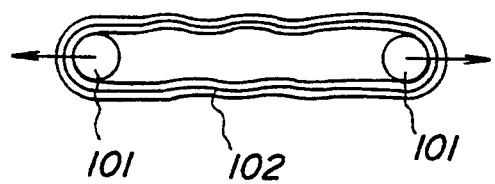
FIG. 15 is an outline view of a fourth alternative apparatus according to the second embodiment.
Figure 16:
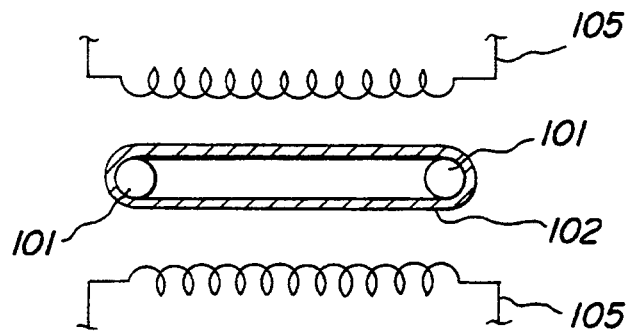
FIG. 16 is a working explanation view of FIG. 15.

The mandrel of this embodiment comprises two shafts on which the film sheet is wound. As shown in FIG. 15, the two shafts are of a movable engagement when the film sheet is wound on the mandrel 111. During the heating process, the two shafts are extended at the distance from each other to effect a extension force to the film sheets form as shown in FIG. 16. The extension force causes the air between the laminated sheets to be expelled and the laminated sheets to be adhered to each other into an integral sheet through the molten matrix resin.

Example 11

Figure 17:
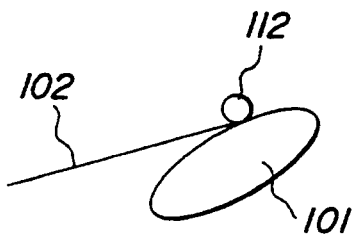
FIG. 17 is an outline view of a fifth alternative apparatus according to the second embodiment.
Figure 18:
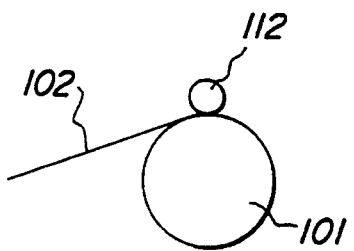
FIG. 18 is an outline view of a sixth alternative apparatus according to the second embodiment.

In this embodiment, the film sheet is wound on the mandrel and is compressed during the heating process. For example, the laminated sheets 102 is heated at the molding temperature and is pressed against the mandrel 101 with a pressure roller 12 as shown in FIGS. 17 and 18. Another method is that the film sheet is wound on the mandrel 101 while being subjected to an extension force in place of the pressure roller.

Example 12

Figure 19:
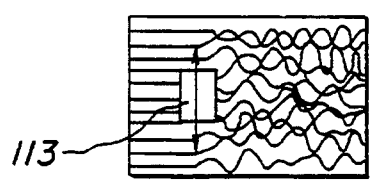
FIG. 19 is an outline plane view of a sixth alternative apparatus according to the second embodiment.
Figure 20:
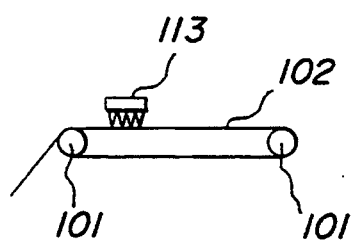
FIG. 20 is a side view of FIG. 19.
Figure 21A:
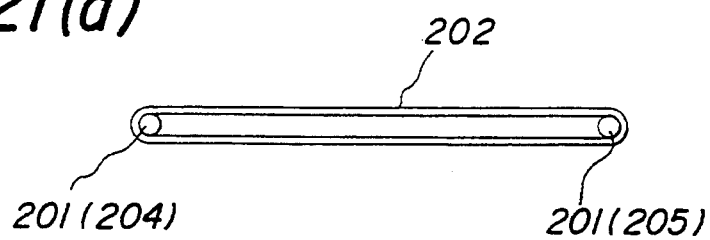
FIG. 21 is an outline view of the molding apparatus according to the third embodiment of the present invention.
Figure 21B:
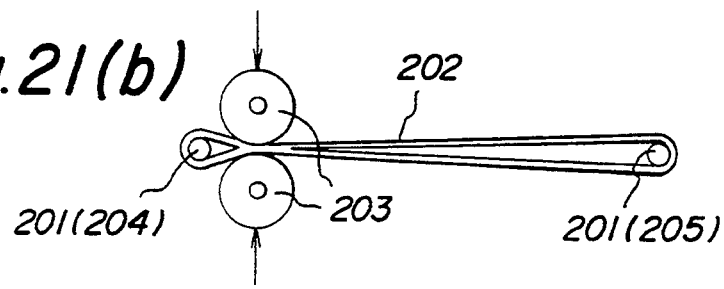
Figure 21C:
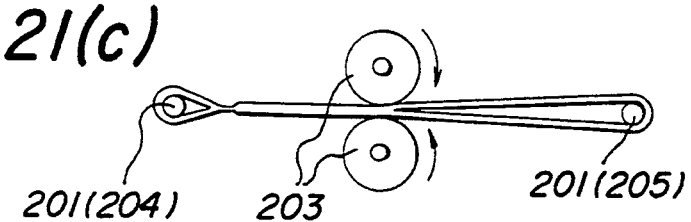
Figure 21D:
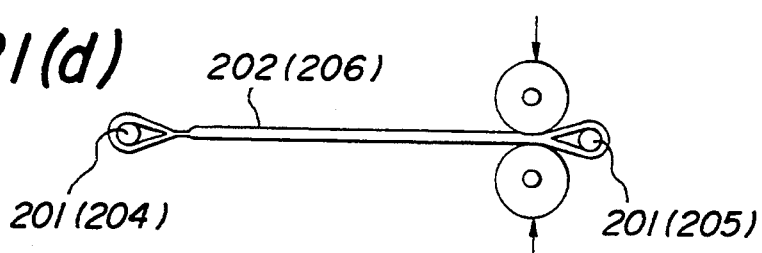
Figure 21E:
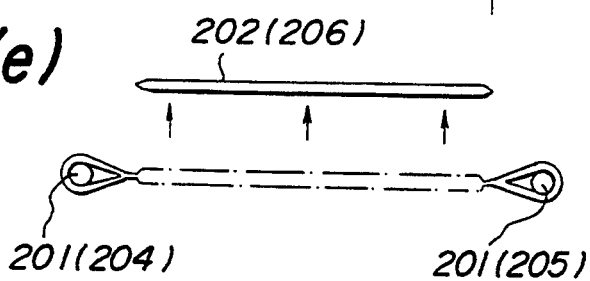
Figure 22A:
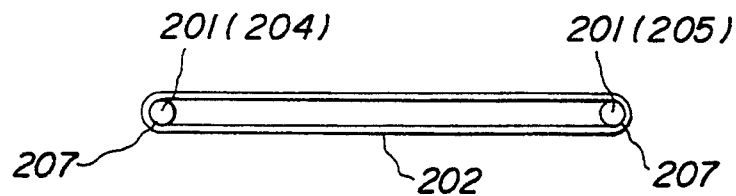
FIG. 22 is an outline view showing the molding steps of the alternative example.
Figure 22B:
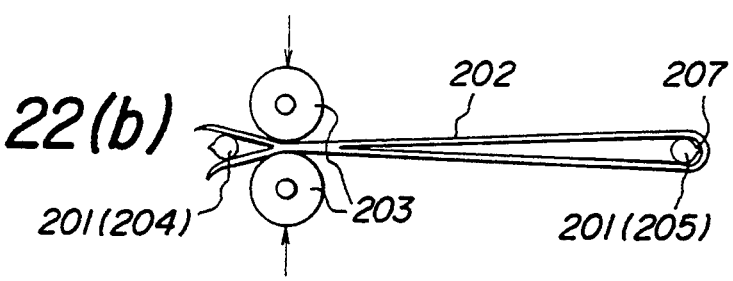
Figure 22C:
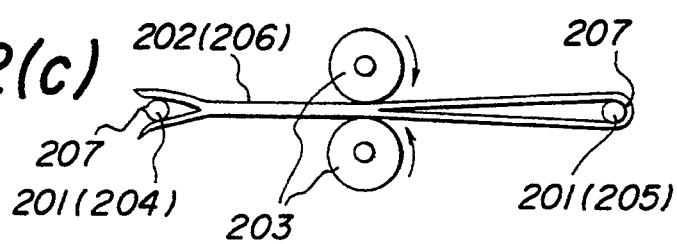
Figure 22D:
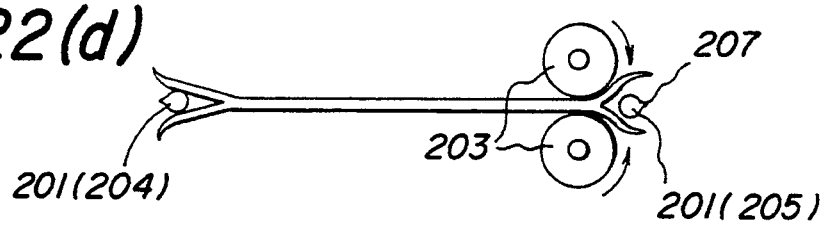
Figure 22E:
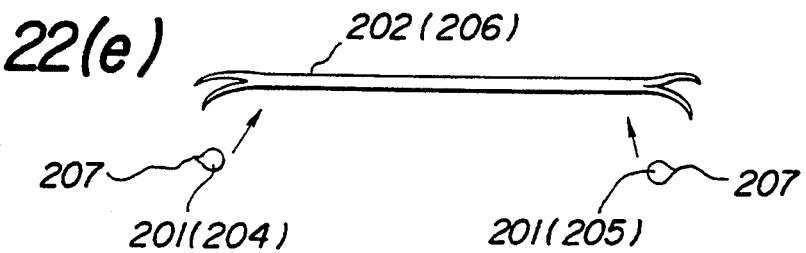

Referring to FIGS. 19 and 20, the apparatus of this embodiment comprises a dispersing means 113 to disperse an orientation of the LCR fibers at the molding temperature of the matrix resin. The dispersing means 113 is of a wire brush which is brought into contact with the laminated film sheets in a direction perpendicular to the orientation direction of the LCR. At the molding temperature, the orientation of the LCR is disturbed by the dispersing means 113. As a result, the resultant integral mold product has the mechanical strength changed from anisotropic to isotropic property of the LCR and at the same time has the adhesion strength between the integral sheets improved.

Embodiment 3

Example 13

The used matrix resin is PA6 (1013B, melting point=215° C., made by UBE INDUSTRIES LTD.). The used liquid crystal resin is aromatic polyester (VECTRA A950 mace by POLYPLASTIC Co., Ltd; melting point; 290° C.). The composite material is prepared from a mixture of 60 weight % of polystyrene and 40 weight % of aromatic polyester and then extruded into a film form with a two shaft extruder (type ST-30-S2-36L made by RESEARCH LABORATORY OF PLASTICS TECHNOLOGY) at the following extrusion condition: screw diameter, 30 mm; resin temperature, 290° C.; screw rotation number, 100 rpm; and shear rate, 1700 sec$^{-1}$.

The extruded sheet of a film form 102 is wound around a mandrel 101 of a plate form, that is, a winding shaft so as to form an integral resin sheet. The laminated film sheets are heated with the heating means. The heating condition is different from the plate thickness of the final product.

This embodiment is subjected to the following heating conditions:

| plate thickness | inside temperature (upper limit) | outside temperature (upper limit) |
| --- | --- | --- |
| 3 mm–5 mm | 260° C. | 270° C. |
| 5 mm–7 mm | 250° C. | 270° C. |
| 7 mm–9 mm | 240° C. | 270° C. |

In such a way, the heating condition is adjusted to achieve the inside temperature and the outside temperature in accordance with the plate thickness. The later pressing operation can be carried out in a similar condition to that listed above.

When the outside temperature is higher than 270° C., the LCR starts to be soft and to change in the properties. Accordingly, it is necessary not to make the outside temperature higher than 270° C.

The laminated film sheets around the two shaft mandrel 201 is pressed with the pressure roller 203 so as to be adhered to each other into an integral sheet. In this case, the pressure roller is positioned near to one shaft 204 of the mandrel 201 and presses the integral resin sheets so as to adhere to each other. The integral resin sheet is cut at a position near to the one shaft 204. Then, the pressure roller 203 is adjusted in the pressing gap to match the final thickness of the integral resin sheet. As shown in FIG. 21, the roller 203 moves rotatably from the left side to the right side under keeping the pressing gap. The pressure roller 203 keeps the pressing gap equivalent to a thickness of the integral resin sheet having no gap at the middle part. Accordingly, the integral resin sheets are strongly adhered to each other. When the pressure roller 203 moves to a position near to the another shaft 205 of the mandrel 201, the pressure roller is further shortened in the pressing gap. As a result, the integral resin sheet is cut at the position near to the another shaft 205. It is possible to obtain a thick plate of composite material having LCR fibers dispersed in matrix resin. The thick plate has a length equivalent to the distance between two shafts 204 and 205 of the mandrel 201 and a thickness equivalent of the pressing gap of the pressure roller.

It is necessary to heat the pressure roller 203 and the shafts 204 and 205 of the mandrel 201 to a temperature which is higher than the minimum moldable temperature, that is, a melting point of the matrix resin and which is lower than the transition temperature of the LCR.

Example 14

The used matrix resin is PP (H501, melting point=176° C., made by SUMITOMO KAGAKU LTD.). The used liquid crystal resin is aromatic polyester (VECTRA A950 mace by POLYPLASTIC CO., LTD; melting point; 290° C.). The composite material is prepared from a mixture of 40 weight % of PP and 60 weight % of aromatic polyester and then extruded into a film form with a two shaft extruder (type ST-30-S2-36L made by RESEARCH LABORATORY OF PLASTICS TECHNOLOGY) at the following extrusion condition: screw diameter, 30 mm; resin temperature, 290° C.; screw rotation number, 100 rpm; and shear rate, 1700 sec$^{-1}$.

As shown in FIG. 22, the film sheet 202 is wound around the two shafts of the mandrel 201 and is heated at the following condition.

It is to be noted that the hearing temperature is higher than the minimum moldable temperature and is lower than the transition temperature of the LCR. The heating condition varies with the thickness of resultant mold resin plate in a similar way to that of Example 13. The heating condition of this embodiment is carried out in the following manner. This embodiment follows the conditions described below.

| plate thickness | inside temperature (upper limit) | outside temperature (upper limit) |
| --- | --- | --- |
| 3 mm–5 mm | 210° C. | 220° C. |
| 5 mm–7 mm | 200° C. | 220° C. |
| 7 mm–9 mm | 190° C. | 220° C. |

It is necessary to make the outside temperature lower than 220° C. because the matrix resin decomposes upon being heated at a temperature higher than 220° C. At this temperature, the pressure roll moves between two shafts under pressing the laminated film sheets 202. In this embodiment, the two shafts 204 and 205 of the mandrel 201 are equipped with a sharp edge extending to a direction perpendicular to the winding direction of the integral resin sheet. Accordingly, the laminated resin sheet is pressed from the direction of the two shafts in a way to prevent the gap in the laminated resin sheet, the resin sheet is in a soft state and is subjected to an extension force. Then, the integral resin sheet is cut and is separated from the one shaft 204 of the mandrel 201. The pressure roller 203 moves rotatablly from the left side to the right side under keeping the pressing gap. At this time, the pressing gap of the pressure roller 203 is of a size to lose the gap at the middle part of the integral resin sheen. The integral resin sheets are strongly adhered to each other. When the pressure roller 203 moves to a position near to the other shaft 205 of the mandrel 201, the integral resin sheet is cut with the sharp edge equipped at the shaft 205 in response to an increase in the expansion force applied to the integral resin sheet. Then, the integral resin sheet is separated from the mandrel 201.

Figure 23:
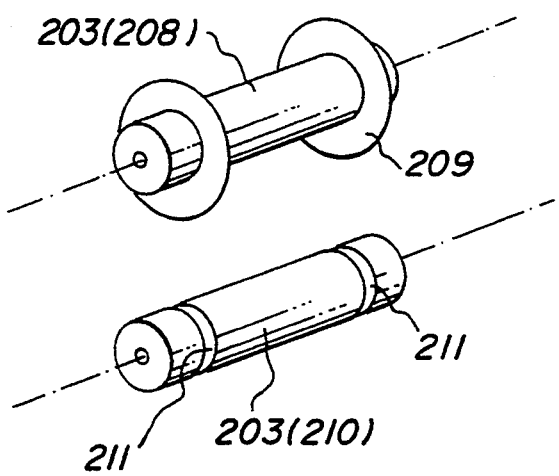
FIG. 23 is an outline view of rollers used in the further alternative example.
Figure 24:
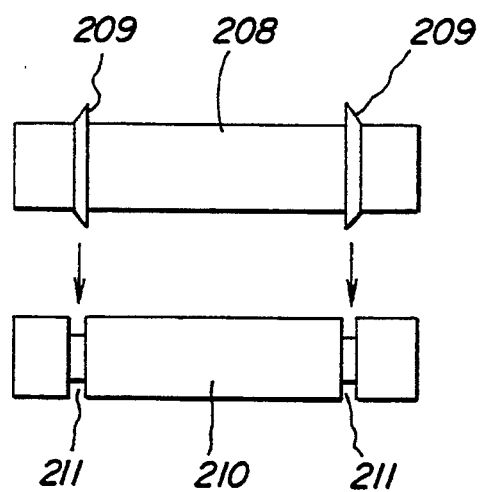
FIG. 24 is a sectional view of rollers shown in FIG. 23.
Figure 25A:
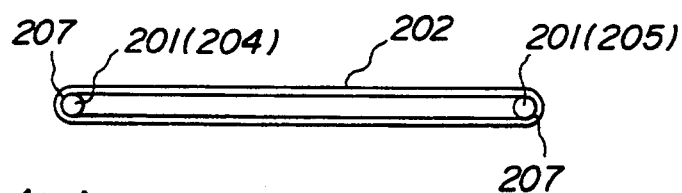
FIG. 25 is an explanatory view of FIG. 23.
Figure 25B:
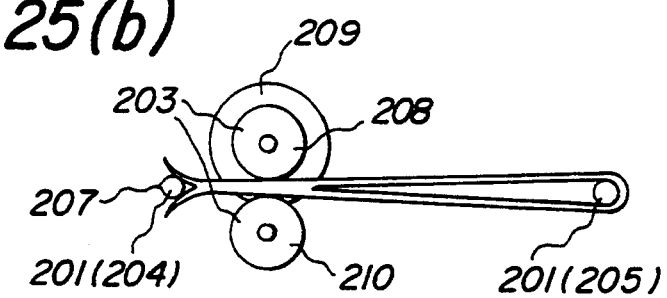
Figure 25C:
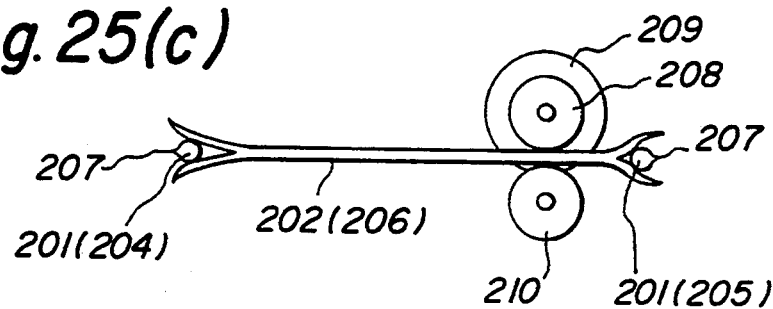
Figure 25D:
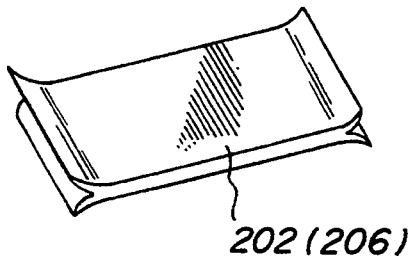

It is possible to obtain the thick integral plate of composite material having LCR fibers dispersed in the matrix resin. the thick plate has a length equal to the distance between two shafts 204 and 205 of the mandrel 201 and has a constant thickness. FIGS. 23 and 24, the description is directed to the modification of Example 14. The upper roller 208 of the pressure roller 203 has the projected edge formed at both sides around the all periphery of the upper roller. The lower roller 210 has grooves formed at both sides around the all of the periphery of the lower roller 210. The grooves receive the projected edges.

Such a structure makes it possible to permit the integral resin sheet to have a constant width because the both sides of the integral resin sheet is cut with the projected edges during the movement of the pressure roller 3.

FIG. 26 is a cross sectional view of a heating and pressing apparatus for executing the heating and pressing operations.

The heating and pressing apparatus 212 of this embodiment is equipped, at the bottom thereof, with a belt conveyer 213 to move under carrying the laminated resin sheets wound around the mandrel 201. The belt conveyer 213 is provided with two pulleys 214 and 215 at upper portion thereof and two pulleys 216 and 217 at the lower portion thereof. The belt 218 is driven by the rotation of the pulleys 214 to 217. The upper portion of the belt conveyer 213 is opened and is accommodated in the lower casing 219. The horizontal portion at the upper part of the belt 218 has the height the same as the upper portion of the lower casing 219. The integral resin sheet 202 wound around the mandrel 201 is placed on the center portion of the belt 218. The lower roller 210 of the pressure roller 203 is positioned at the lower side of the horizontal part 220. In addition, an infrared heating means 221 also equipped at the lower side of the horizontal part. There is placed an upper casing 222 above the laminated resin sheets 202. The upper casing 222 is provided with the upper roller 208 and the infrared heating means positioned above the upper roller 208.

The pressure roller 203 is placed at the center of the upper horizontal portion of the belt conveyer 213 neat to the winding shaft 204 in a way to pinch the belt between the upper roller 208 and the lower roller 210. When the laminated resin sheet 202 is heated to a given temperature with the heating means 221, the belt conveyer 213 is driven in a way to move the upper horizontal portion 220 from the right side to the left side. In association with this movement, the laminated resin sheet 202 placed on the horizontal portion is moved from the right side to the left side under being pressed with the pressure roller 203 to give an integral sheet.

Embodiment 4

As shown in FIG. 27, the extruded resin sheets 3 and 4 are extruded form extruders 301 and 302. The used matrix resin is PA6 (1013B, melting point=2150° C., made by UBE INDUSTRIES, LTD.). The used LCR resin is aromatic polyester (VECTRA A950 mace by POLYPLASTIC CO., LTD; melting point; 290° C.). The mixture of reagents mentioned above is extruded into a film form with a two shaft extruder (type ST-30-S2-36L made by RESEARCH LABORATORY OF PLASTICS TECHNOLOGY) at the following extrusion condition: screw diameter, 30 mm; resin temperature, 290° C.; screw rotation number, 100 rpm; and shear rate, 1700 sec$^{-1}$. The first and the second extruders extrude the composite materials consisting of, as an average, 40 weight % of matrix resin and, as an average, 60 weight % of LCR, respectively. The composite material extruded from the second extruder is of a content ratio of LCR four times of that of the first extruder.

Accordingly, the extruded film sheet 303 from the first extruder 301 is superior in the adhesion and the extruded film sheet 304 from the second exturder 302 is superior in the mechanical strength. The first and the second film sheets 303 and 304 are adhered to each other into an integral sheet with an adhering roller 305. The integral sheets are cooled in a cooling chamber 306 having cooling water fulfilled therein. Then, the cooled integral resin sheet is extended into a plate having a given thickness with a extending roller 309. The extended resin sheet is wound around a mandrel 311 at a temperature at which the extruded resin sheet is not cured incorrectly.

The wound resin sheet is further rewound around another winding means (not shown) and then pressed to each other to obtain a thick resin plate of a composite material having LCR fibers dispersed in matrix resin.

What is claimed is:

1. A method for preparing a liquid crystal resin composite sheet which comprises the steps of:
   1) preparing a thermoplastic composite mixture from a thermoplastic matrix resin and a thermoplastic liquid crystal resin which has a liquid crystal transition temperature higher than a minimum moldable temperature of said matrix resin in a mixture proportion wherein the liquid crystal resin is capable of being melt-extruded into a fiber in the matrix resin,
   2) heating the liquid crystal composite mixture up to a state capable of melt-extruding,
   3) melt-extruding a liquid crystal film from the melt thermoplastic composite mixture at a shearing rate whereat the liquid crystal resin is capable of melt-extruding into the fibers having an aspect ratio of 3 or more,
   4) superposing the liquid crystal film to form liquid crystal composite films,
   5) heating the superposed liquid crystal composite films up to a melt-bonding temperature higher than the minimum moldable temperature of the matrix resin and lower than the liquid crystal transition temperature, and
   6) pressing the superposed liquid crystal composite films at the melt-bonding temperature while discharging air therebetween to form the liquid crystal resin composite sheet.

2. The method for molding a liquid crystal resin composite sheet according to claim 1, wherein the heating and pressing steps are carried out by passing the extruded film sheets between a pair of roller to be superposed at a melt-bonding temperature higher than the minimum moldable temperature of the matrix resin and lower than the liquid crystal transition temperature while discharging the air therebetween by means of roller pressure.

3. The method for preparing a liquid crystal resin composite sheet according to claim 1, wherein the liquid crystal resin composite film sheets just extruded from the plurality of the dies are cooled down to a temperature lower than the minimum moldable temperature of the matrix resin and then are heated up to the melt-bonding temperature.

4. The method for preparing a liquid crystal resin composite sheet according to claim 1, further comprising drawing the superposed liquid crystal composite films at the same time as the pressing.

5. The method for preparing a liquid crystal resin composite sheet according to either one of claims 1 to 4, wherein the heating and pressing steps are carried out by setting the sheet materials in a manner that the liquid crystal resin fiber thereof are oriented in a different direction to each other.

* * * * *